May 16, 1961

F. A. FAUE 2,984,508

AUTOMOBILE SANDING DEVICE

Filed May 6, 1959

INVENTOR:
Floyd A. Faue,

BY Bair, Freeman & Molinare
ATTORNEYS.

May 16, 1961  F. A. FAUE  2,984,508
AUTOMOBILE SANDING DEVICE
Filed May 6, 1959  2 Sheets-Sheet 2
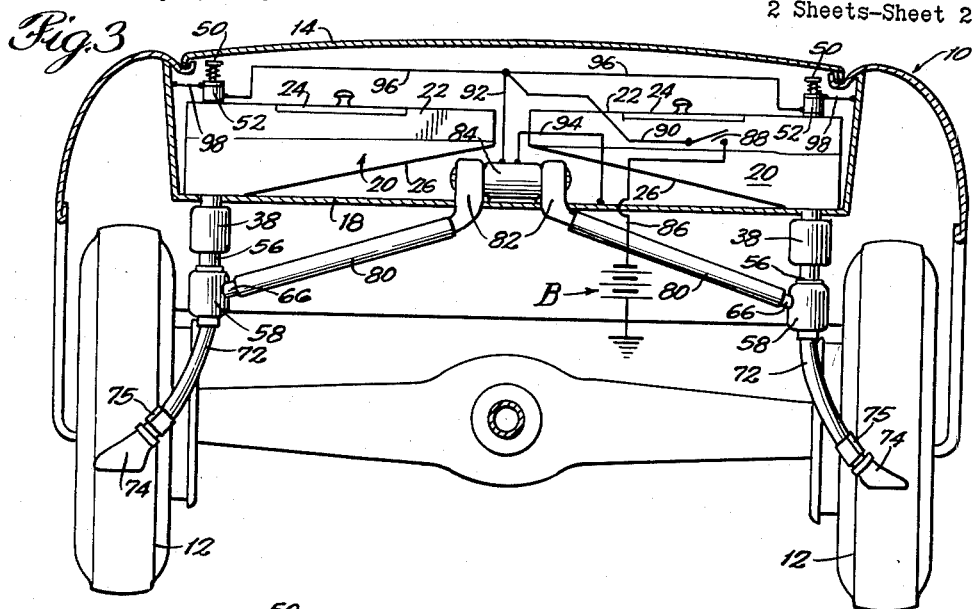
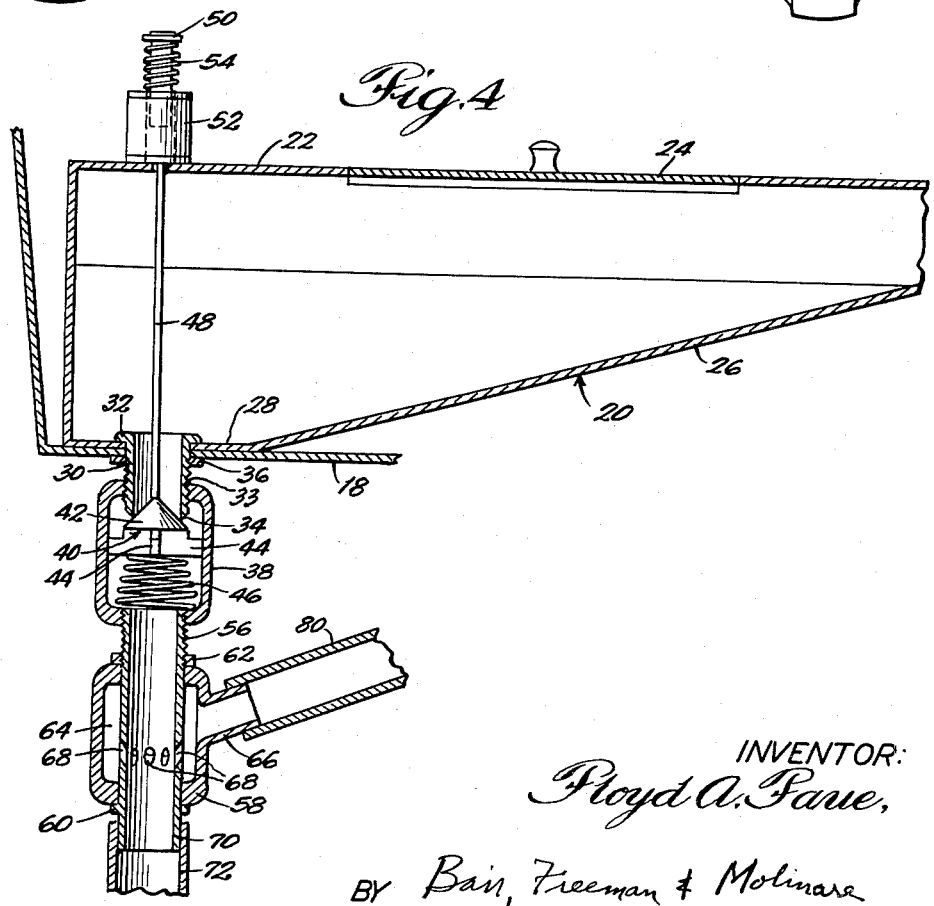
INVENTOR:
Floyd A. Faue,
BY Bair, Freeman & Molinare
ATTORNEYS.

ns of the sanding device disclosed herein and is taken substantially on line 4—4 of Figure 2.

United States Patent Office 2,984,508
Patented May 16, 1961

2,984,508
AUTOMOBILE SANDING DEVICE
Floyd A. Faue, 1609 W. Thome St., Chicago 26, Ill.
Filed May 6, 1959, Ser. No. 811,423
1 Claim. (Cl. 291—41)

This invention relates to a sanding device for automotive type vehicles and is more particularly directed to a sanding device for assisting automotive vehicles to gain traction at a time when the vehicle is stationary.

Road sanding devices for use with automotive type vehicles are, generally, notoriously old. However, such devices in the past have been principally designed to increase the traction of a moving vehicle by depositing the traction-increasing sand onto the ground forwardly of the path of movement of the wheels of the vehicle. If such prior devices are to be used with vehicles which are just attempting to get moving, it is found that said devices are unable to be of any assistance, because sand deposited onto the ground forwardly of the wheels, while useful after the vehicle begins to move, is absolutely of no use when the vehicle is standing still.

Actually, the most important time to get increased traction with vehicles whose drive wheels are in snow or in ice, is when the vehicle is stationary or nearly stationary. Once the vehicle begins to move, even a small amount of traction between the drive wheels and the snow or ice is usually sufficient to maintain the vehicle's motion. But when the vehicle is at rest, a much larger amount of initial traction is required to initiate movement than is required to sustain movement.

Accordingly, the principal object of this invention is to provide a sanding device for automotive-type vehicles which will deposit sand onto the ground at the region where the ground-engaging portion of a wheel engages the ground, so that the sand will be useful in initiating movement of the vehicle from a stationary condition.

Another object of this invention is to provide a new and improved sanding device which efficiently deposits traction-increasing sand at the region and at the time most efficient for traction-gaining purposes.

A further object of this invention is to provide a simplified sanding device which is characterized by its simplicity and inexpensiveness of construction and by its efficiency of operation.

Further objects and advantages of this invention will become apparent as the following description proceeds and the features of novelty which characterize this invention will be pointed out with particularity in the claim annexed to and forming part of this specification.

A preferred embodiment of the invention is shown in the accompanying drawings, in which:

Figure 3 is a cross-section view taken on line 3—3 of Figure 2; and

Figure 4 is an enlarged fragmentary cross-section view through the sand box, control valve, and air entraining means of the sanding device disclosed herein and is taken substantially on line 4—4 of Figure 2.

Figures 1, 2:
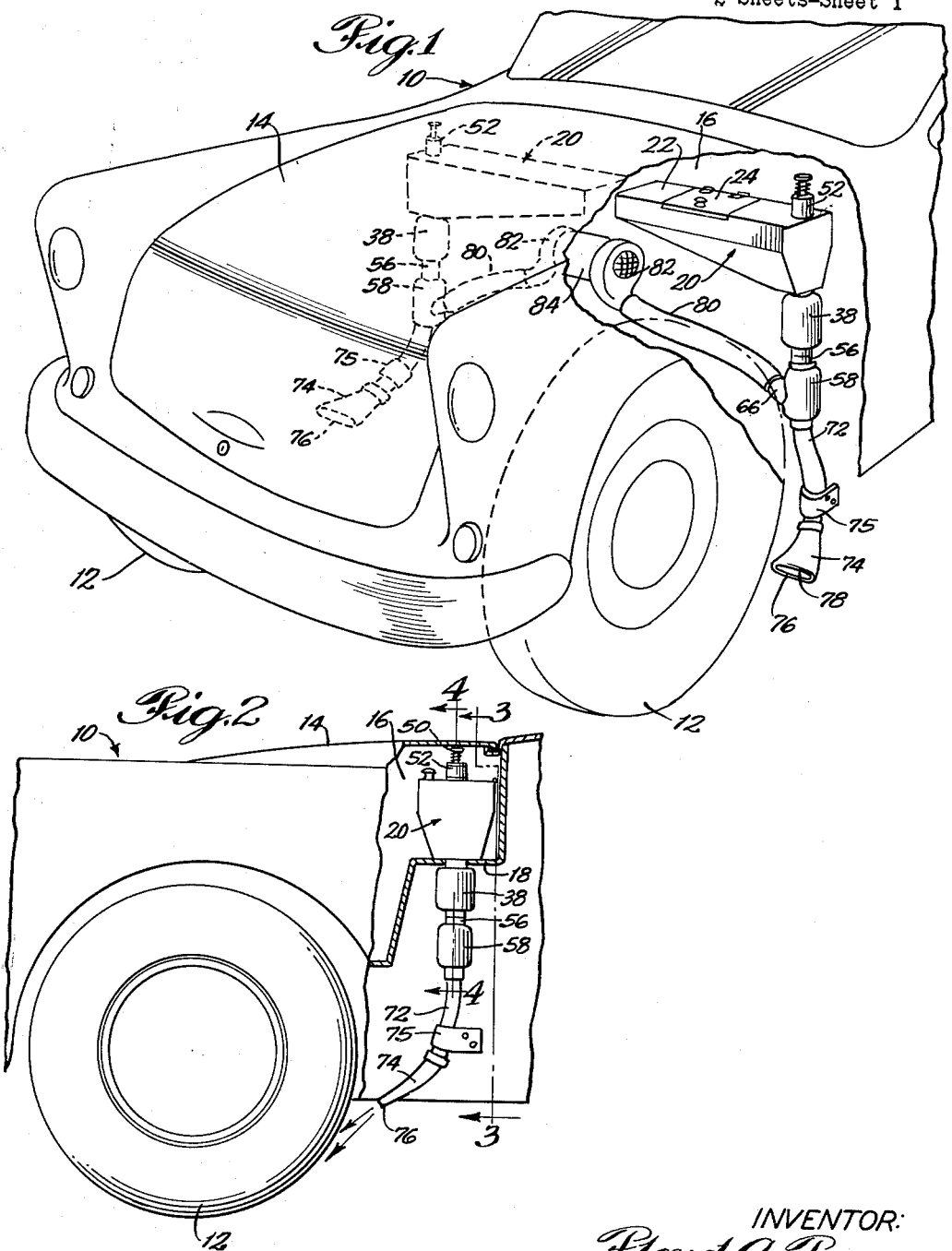
Figure 1 is a fragmentary perspective view with portions broken away showing an automobile equipped with the novel sanding device of this application.
Figure 2 is a fragmentary side elevation and cross-section view, with portions broken away, showing the relationship of the sanding device to the adjacent wheel of the vehicle.

Referring now to the drawings, there is shown in Figures 1–3 an automobile generally indicated at 10 having a pair of tire-carrying rear wheels 12 and provided with a trunk lid 14 which closes off a trunk space 16 which is located normally between and above the rear wheels of the automobile. More specifically, the bottom wall of the trunk space 16 is shaped to define a shelf 18, at the forward end of the trunk, extending across the width of the trunk and spaced below the trunk lid 14.

There is shown in this disclosure a sanding device for each rear wheel 12 of the automobile. Each sanding device includes a sand-containing box 20 having upright side walls and a top wall 22 which is provided with a removable lid 24 which permits of introduction of additional sand into the box 20 to replenish the sand supply as needed. A portion of bottom wall 26 of sand box 20 is inclined downwardly and laterally outwardly, as can best be seen in Figures 1, 3 and 4. Such an arrangement provides that the sand in box 20 will normally be fed by gravity to the lowest portion thereof which is bounded by a horizontal mounting portion 28 of bottom wall 26, which wall portion 28 engages the shelf 18 in the trunk of the automobile. The mounting wall 28 and shelf 18 of the automobile are apertured and their apertures are aligned; and there is provided an upright connecting sleeve, or ferrule, 30 having an outwardly flanged head 32 at one end for engaging the interior of mounting wall 28 and the wall of sleeve 30 is threaded as at 33. The other end of sleeve 30 forms a valve seat 34. A nut 36 cooperating with threads 33 operates to securely clamp the sand box 20 to the shelf 18.

Also threaded onto sleeve 30 is a hollow valve body 38. A vertically movable valve generally indicated at 40 is positioned within valve body 38, and said valve 40 includes a valve cone 42 adapted to cooperate with valve seat 34. Below the valve cone 42 are a plurality of radially extending arms defining a spider 44 against which the upper end of a spring 46 abuts, the lower end of said spring 46 engaging the inner lower portion of the valve body 38. The valve cone 42 has an actuating stem 48 extending upwardly therefrom coaxially of sleeve 30, and through the height of sand box 20 and is connected at its upper end to a solenoid plunger 50. A solenoid coil 52 is mounted on the top 22 of the sand box 20, and an additional spring 54 is provided normally biasing the solenoid plunger 50 to the closed valve condition seen in Figure 4.

Threadably connected to the underside of valve body 38 is an upright tubular section 56. An air-receiving sleeve 58 is snugly positioned on tubular section 56 and is in abutment with an annular flange 60 carried on tubular section 56. The sleeve 58 is clamped against flange 60 by means of a nut 62 threaded along tubular section 56. A portion of the walls of sleeve 58 are spaced from the tubular section 56 to define an annular space 64 therebetween. The sleeve 58 is formed with a laterally and upwardly inclined nipple 66, to which an air carrying tube may be connected. A portion of the wall of tubular section 56 which is adjacent air space 64 is bored to define a plurality of inclined apertures 68 therethrough, the apertures 68 inclining radially inwardly and downwardly.

The lower end of tubular section 56 defines a nipple 70 to which a flexible tubular conduit 72 may be connected, and the lower end of conduit 72 emerges with a sand-dispensing nozzle 74 which is fixedly held in position as indicated in Figures 1 to 3, by means of a looped strap 75 which is connected to an appropriate portion of the frame or body of the automobile. The dispensing tip 76 of nozzle 74 is directed downwardly and rearwardly, as best seen in Figures 1 and 2, so as to direct the sand issuing therefrom to points substantially coincident with the portion of the ground which the tire of wheel 12 engages. The dispensing tip 76 is of fish-tail design defining a laterally elongated and vertically reduced nozzle orifice 78 which provides a fanned-out discharge that is substantially of the same width as the tire on wheel 12, so as to dispense the sand over the area where it is most useful.

It will be understood that the sand-dispensing device must not interfere with the wheels of the vehicle, and since the nature of any wheel is that the portion of the wheel which engages the ground is located rearwardly and below the forwardmost portion of the wheel, there exists the problem of getting the sand to the area where it is needed. The physical layout requires that the sand be dispensed forwardly of the wheels 12 and thus the sand-dispensing means including the upright valved conduit means herein disclosed are arranged, as seen in Figures 1 and 2, for dispensing sand therefrom at a point located slightly forwardly of the rear wheels 12 of the automobile. In order to deliver the sand to the point whereat the wheels 12 engage the ground, pressurized air means are provided, as herein described, for entraining the sand and delivering it to the ground at points rearwardly of where the sand is dispensed from the nozzle 74.

The nipple 66 of sleeve 58 has connected thereto a flexible tubular conduit 80 which connects at its other end to the discharge orifice of a centrifugal blower 82 that is driven by an electric motor 84. The motor 84 is arranged so that each end of its rotor shaft is coupled to and drives the rotor of a centrifugal blower 82.

The circuit to the electric motor 84 is illustrated in Figure 3 and includes the battery B, lead 86, single pole switch 88, leads 90 and 92 to motor 84, and from motor 84 through lead 94 to ground. The circuits for energizing the solenoid coils 52 each include the battery B, lead 86, switch 88 and lead 90, and then include a lead 96 to the solenoid coil 52 and from solenoid coil 52 through a lead 98 to ground. It will be noted that the single switch 88 simultaneously controls both the discharge of sand and delivery of pressurized air.

In the operation of the device, when the vehicle is on ice or in snow to the extent that the normal traction available from wheels 12 is insufficient to initiate movement of the vehicle, then by closing switch 88, which preferably is conveniently arranged on the dashboard of the automobile, the motor 84 begins to deliver compressed air from blowers 82 through conduits 80, and the solenoid coils 52 are energized to effect downward movement of valve cones 46 against the bias of springs 54 and 46. Sand, which is contained in the sand box 20, then moves under gravity through sleeve 30 and through valve body 36 into tubular section 56. The air under pressure from the centrifugal blowers 82 enters tubular section 56 under pressure higher than atmospheric pressure and at increased velocity through apertures 68, and the air entrains the sand in tubular section 56 and operates to convey the entrained sand through conduit 72 to nozzles 74, to be discharged therefrom and to be deposited at the point where the wheel 12 engages the ground. It is essential to deposit the sand at the points where the wheels 12 engage the ground since the vehicle is not moving, and in order to increase traction, the sand must be deposited where it will be useful. After the vehicle begins moving, the demand for traction is not as great as when the vehicle is at rest, and then the switch 88 may be opened to discontinue further operation of the sanding device.

The nozzle 74 is preferably detachably coupled to conduit 72, thereby permitting selective removal of nozzle 74 for cleaning and servicing. It is also contemplated that each nozzle 74 would be provided with an electrical resistance heater mounted either exteriorly or interiorly of nozzle 74, and for the purpose of heating nozzle 74 so as to free the nozzle of ice accumulations which might tend to obstruct the nozzle orifice 78. The resistance heaters for nozzles 74 could be energized by circuits separate from the blower and solenoid circuits shown herein, or could be energized by parallel circuits which are controlled by the same control switch 88 which operates to initiate the discharge of sand and delivery of pressurized air.

While there has been shown and described a particular embodiment of this invention, it will be obvious to those skilled in the art that various changes and modifications may be made therein without departing from the invention and, therefore, it is intended in the appended claim to cover all such changes and modifications as fall within the true spirit and scope of the invention.

What I claim as new, and desire to secure by Letters Patent of the United States, is:

A sanding device for an automotive-type vehicle comprising, in combination: sand-storage means including a gravity-feed for dispensing sand therefrom at a point located forwardly of but adjacent to the rear wheels of the vehicle; upright elongated conduit means associated with each rear wheel for receiving the sand from said sand-storage means; solenoid-controlled valve means in said upright conduit means for controlling flow of sand from the sand-storage means; electrically energized blower means for delivering atmospheric air under constant pressure to each conduit means to effect entrainment of sand with pressurized air; nozzle means at the lower terminal end of each conduit means pointed downwardly and rearwardly to direct the stand entrained by the pressurized air rearwardly of the forward edge of the rear wheel and to the ground directly adjacent the ground-engaging portion of the rear wheel; means for effecting entrainment of sand with pressurized air including a tubular section of said sand conduit means, an air-receiving sleeve completely surrounding said tubular section, and inwardly and downwardly inclined, and circumferentially spaced, passageways through the wall of said tubular section providing for directed flow of pressurized air from said sleeve into said sand-carrying tubular section, and electrical means including a single control switch for simultaneously opening the valve means to effect delivery of sand and to provide pressurized air from said blower means for entraining the sand in air, for delivery of the sand to the said regions adjacent the ground-engaging portions of the rear wheels.

References Cited in the file of this patent

UNITED STATES PATENTS

| | | |
|---|---|---|
| 1,352,205 | Lintern | Sept. 7, 1920 |
| 1,497,198 | Sherwin | June 10, 1924 |
| 2,033,322 | Boyer et al. | Mar. 10, 1936 |
| 2,131,514 | Johnson et al. | Sept. 27, 1938 |
| 2,211,256 | Dashner | Aug. 13, 1940 |
| 2,672,361 | Werbe | Mar. 16, 1954 |